United States Patent
Ishikawa

(10) Patent No.: US 10,365,923 B2
(45) Date of Patent: Jul. 30, 2019

(54) INFORMATION PROCESSING DEVICE, INFORMATION PROCESSING SYSTEM, AND CONTROL METHOD

(71) Applicant: FUJITSU LIMITED, Kawasaki-shi, Kanagawa (JP)

(72) Inventor: Keiya Ishikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/951,232

(22) Filed: Apr. 12, 2018

(65) Prior Publication Data
US 2018/0307475 A1 Oct. 25, 2018

(30) Foreign Application Priority Data

Apr. 20, 2017 (JP) ................................ 2017-083709

(51) Int. Cl.
G06F 8/65 (2018.01)
H04L 29/08 (2006.01)
H04L 12/24 (2006.01)

(52) U.S. Cl.
CPC ............ *G06F 8/65* (2013.01); *H04L 41/0893* (2013.01); *H04L 67/34* (2013.01)

(58) Field of Classification Search
CPC ....................................................... G06F 8/65
USPC ........................................................ 717/171
See application file for complete search history.

(56) References Cited

U.S. PATENT DOCUMENTS

| 8,245,218 B2* | 8/2012 | Giambalvo | G06F 8/61 717/172 |
| 2003/0120801 A1* | 6/2003 | Keever | H04L 63/0272 709/237 |
| 2009/0240791 A1 | 9/2009 | Sakurai et al. | |
| 2012/0102478 A1* | 4/2012 | Jeong | H04W 24/02 717/170 |
| 2014/0089912 A1* | 3/2014 | Wang | G06F 8/65 717/173 |
| 2014/0123123 A1* | 5/2014 | Bahls | G06F 8/65 717/170 |
| 2017/0075677 A1* | 3/2017 | Gross | G01R 31/44 |

FOREIGN PATENT DOCUMENTS

| JP | 2006-113754 | 4/2006 |
| JP | 2009-230171 | 10/2009 |

* cited by examiner

*Primary Examiner* — Qing Chen
*Assistant Examiner* — Clint Thatcher
(74) *Attorney, Agent, or Firm* — Fujitsu Patent Center

(57) ABSTRACT

An information processing device, for an information processing system including a plurality of information processing devices, executes a process causing a processor of the information device to: classify the plurality of information processing devices into a plurality of device groups each including a given number of information processing devices; select information processing devices one by one from each of the plurality of device groups based on a given selection condition; assign the selected information processing devices to a first update group; and transmit, to first information processing devices each of which is any of the plurality of information processing devices and belongs to the first update group, an instruction to update software applied to the first information processing devices.

7 Claims, 14 Drawing Sheets

FIG. 6

| NODE NUMBER | NB TO WHICH NODE BELONGS | STATE |
|---|---|---|
| NODE #0 | NB#0 | MASTER |
| NODE #1 | NB#0 | |
| NODE #2 | NB#1 | MASTER CANDIDATE |
| NODE #3 | NB#1 | |
| NODE #4 | NB#2 | MASTER CANDIDATE |
| ⋮ | ⋮ | ⋮ |

| NODE NUMBER | FW VERSION NUMBER |
|---|---|
| NODE #0 | 1.62 |
| NODE #1 | 1.61 |
| NODE #2 | 1.62 |
| NODE #3 | 1.61 |
| NODE #4 | 1.62 |
| : | : |

213

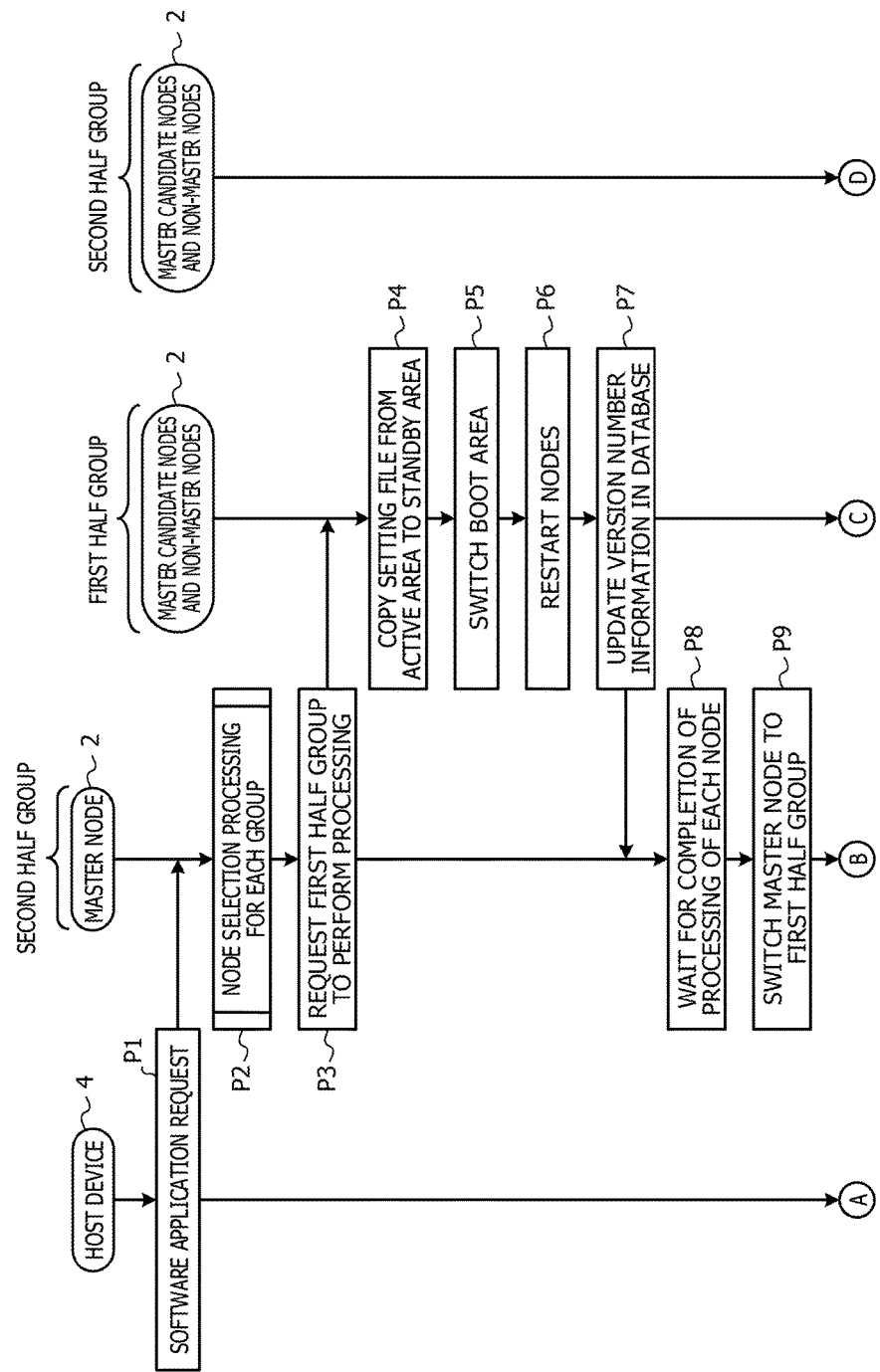

INFORMATION PROCESSING DEVICE, INFORMATION PROCESSING SYSTEM, AND CONTROL METHOD

CROSS-REFERENCE TO RELATED APPLICATION

This application is based upon and claims the benefit of priority of the prior Japanese Patent Application No. 2017-83709, filed on Apr. 20, 2017, the entire contents of which are incorporated herein by reference.

FIELD

The embodiment discussed herein is related to an information processing device, an information processing system, and a control method.

BACKGROUND

In an information processing system including a plurality of information processing devices, a program installed on each of the plurality of information processing devices may be updated.

Incidentally, computers such as servers are cited as the information processing devices. A server may, for example, include a control device of a storage device. Cited as the program are various kinds of software such as an operating system (OS), firmware (FW), a driver, middleware (MW), and an application program.

The programs of the plurality of information processing devices may, for example, be updated by a maintenance worker by a procedure of storing an update version of program in the information processing devices, installing the update version of program on the information processing devices, and restarting the information processing devices. Incidentally, the maintenance worker performs such update operations in order (sequentially) on a device-by-device basis.

Examples of related-art documents include Japanese Laid-open Patent Publication No. 2009-230171 and Japanese Laid-open Patent Publication No. 2006-113754.

SUMMARY

According to an aspect of the embodiment, provided are an information processing device for an information processing system including a plurality of information processing devices. The information processing device includes a memory and a processor. The processor of the information processing device is coupled to the memory and configured to: classify the plurality of information processing devices into a plurality of device groups each including a given number of information processing devices; select information processing devices one by one from each of the plurality of device groups based on a given selection condition; assign the selected information processing devices to a first update group; and transmit, to first information processing devices each of which is any of the plurality of information processing devices and belongs to the first update group, an instruction to update software applied to the first information processing devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of configuration information;

FIG. 8 is a diagram illustrating an example of version number information;

FIGS. 9A and 9B are a diagram illustrating an example of an operation sequence of program update processing for a plurality of nodes in a storage system according to one embodiment;

DESCRIPTION OF EMBODIMENT

Figure 1:
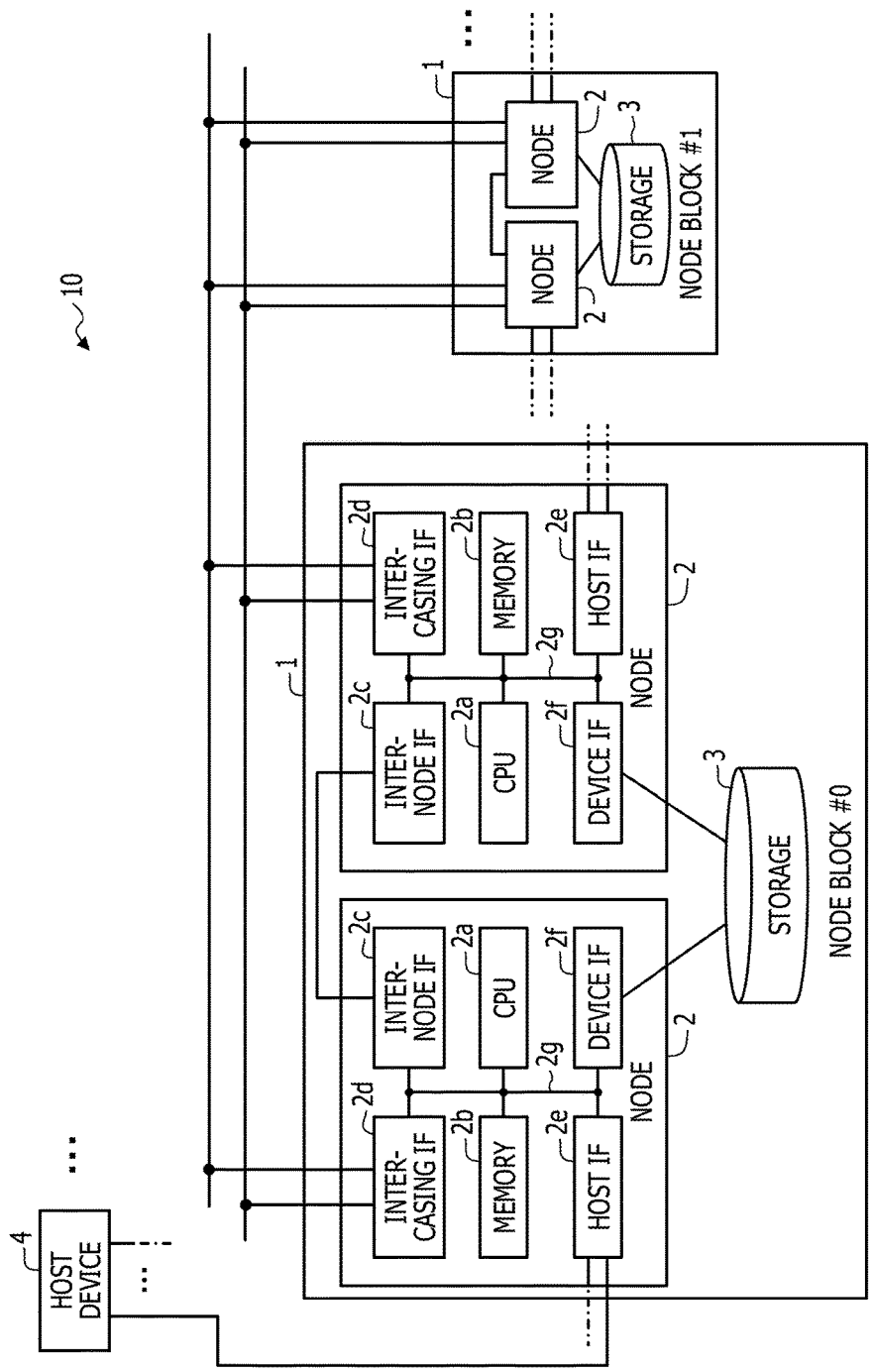
FIG. 1 is a block diagram illustrating an example of configuration of information processing devices according to one embodiment.

In update of programs of a plurality of information processing devices, the information processing devices are restarted. The restart may take a time of approximately 20 minutes, though depending on the configuration of the information processing devices or the like. In an information processing system, such a restart of an information processing device is repeated a number of times corresponding to the number of information processing devices sequentially one at a time. Thus, the larger the scale of the information processing system is, the more a maintenance time taken for the update is increased.

In addition, firmware update operation by a maintenance worker is repeated a number of times corresponding to the number of information processing devices. Thus, the larger the scale of the information processing system, the larger the number of maintenance procedural steps, and the longer the actual working hours of the maintenance worker.

Incidentally, in a case where the information processing devices are control devices of a storage device, a plurality of (for example, two) information processing devices may be configured as one redundant group, and the information processing system may be formed by a plurality of redundant groups. Also in such a case, a maintenance worker updates programs sequentially for one information processing device at a time so that at least one of a plurality of information processing devices constituting a redundant group may continue operation. Hence, the above-described inconvenience may occur also in the case where the information processing devices are control devices of a storage device.

In one aspect, it is an object of the present technology to update the software of information processing devices easily.

An embodiment of the present technology will hereinafter be described with reference to the drawings. However, the embodiment to be described in the following is illustrative only, and is not intended to exclude application of various modifications and technologies not explicitly illustrated in the following. For example, the present embodiment may be modified and carried out in various manners without departing from the spirit of the present technology. Incidentally, parts identified by the same reference symbols in the drawings to be used in the following description represent identical or similar parts unless otherwise specified.

[1] One Embodiment

[1-1] Configuration Example

FIG. 1 is a block diagram illustrating an example of configuration of information processing devices according to one embodiment. As illustrated in FIG. 1, a storage system 10 according to one embodiment is an example of an information processing system, and may, illustratively, include a plurality of node blocks (that may hereinafter be denoted as "NBs" (Node Blocks)) 1 and one or more host devices 4. The storage system 10 may be a scale-out storage system in which NBs 1 may be increased.

An NB 1 may include a plurality of nodes 2 (two nodes 2 in FIG. 1) and a storage (storage device) 3. Incidentally, the NB 1 may be positioned as a storage device in the storage system 10. Incidentally, in the following description, as illustrated in FIG. 1, NBs 1 may be denoted as "NB #0," "NB #1," . . . when one of the NBs 1 is identified.

A node 2 is an example of an information processing device that controls access from the host device 4 to the storage 3. The node 2 may be positioned as a control device of the storage device.

As illustrated in FIG. 1, the node 2 may achieve redundancy (for example, duplexing) with another node 2 within the NB 1, and the node 2 and the other node 2 may constitute a redundant group. For example, each unit of a given number of nodes 2 among a plurality of nodes 2 included in the storage system 10 may be said to constitute a device group.

Two nodes 2 within each NB 1 may share same data on the storage 3. When both nodes 2 within one NB 1 go down, it is difficult for the storage system 10 as a whole to continue operation.

The node 2 may perform each of inter-node communication with another node 2 within the NB 1, inter-casing (inter-NB) communication with a node 2 within another NB 1, inter-host communication with the host device 4, and inter-storage communication with the storage 3.

Here, the plurality of nodes 2 in the storage system 10 may include a master node 2. The master node 2 is a node 2 that manages/controls the whole of the storage system 10. One master node 2 may be determined from among all of the nodes 2 in given timing such as a time of shipment from a factory or a time of a start of the storage system 10.

In addition, the plurality of nodes 2 other than the master node 2 in the storage system 10 may include one or more master candidate nodes 2 that may be a substitute for the master node 2 (that may be a failover destination) at a time of occurrence of a fault in the master node 2. The master candidate node(s) 2 may, for example, be determined by the master node 2 from among all of the nodes 2 in given timing such as a time of a start of the storage system 10.

Thus, the master node 2 and master candidate node(s) 2 may be said to be nodes 2 assigned a role of performing control related to the storage system 10.

Figure 2:
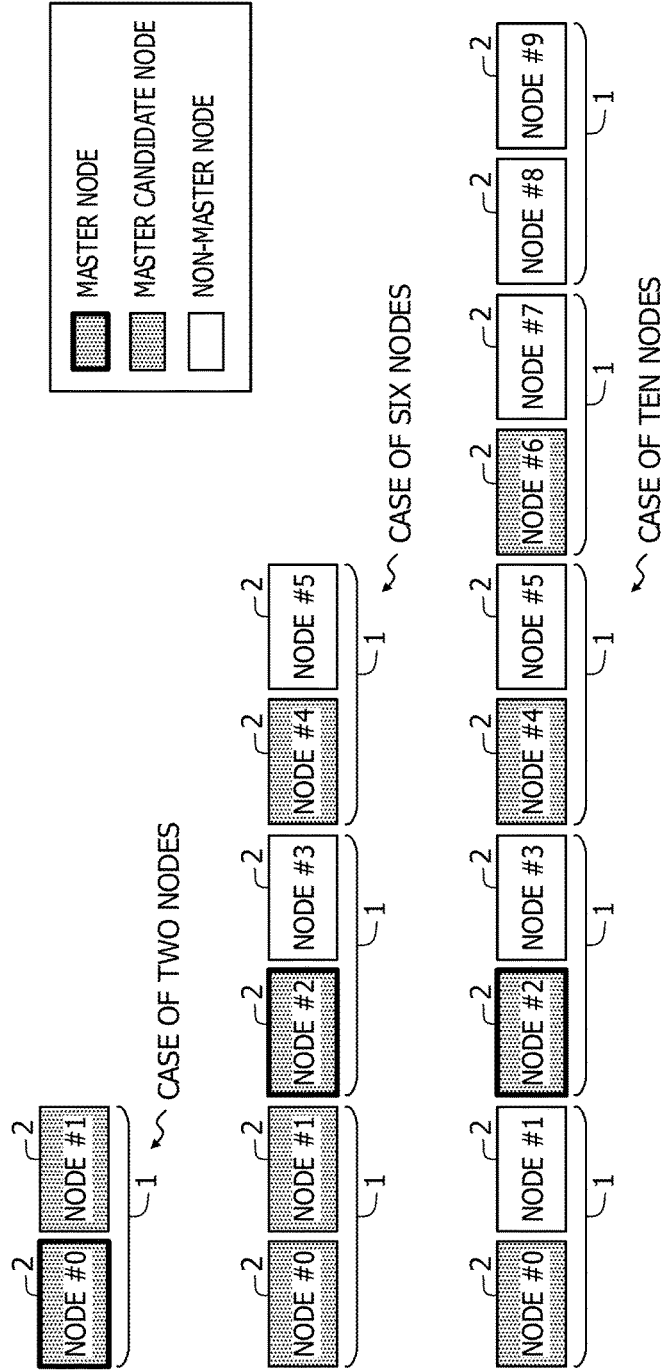
FIG. 2 is a diagram illustrating an example of arrangement of a master node and master candidate nodes.

FIG. 2 illustrates an example of arrangement of a master node and master candidate nodes. The master node and the master candidate nodes illustrated in FIG. 2 may be the master node 2 and master candidate nodes 2 described with reference to FIG. 1. Incidentally, in the example of FIG. 2, the master node 2 is represented by a thick frame and shading, the master candidate nodes 2 are represented by shading, and nodes (hereinafter denoted as "non-master nodes") 2 not classified as any of the master node 2 and master candidate nodes 2 are represented with a white background. In addition, in the following description, as illustrated in FIG. 2, nodes 2 may be denoted as "nodes #0 to #9" when one of the nodes 2 is identified.

As illustrated in FIG. 2, in a case where the storage system 10 includes two nodes 2, the node #0 is the master node 2, the node #1 is the master candidate node 2, and there is no non-master node 2. In addition, in a case where the storage system 10 includes six nodes 2, the node #2 is the master node 2, the nodes #0, #1, and #4 are the master candidate nodes 2, and the nodes #3 and #5 are the non-master nodes 2. Further, in a case where the storage system 10 includes ten nodes 2, the node #2 is the master node 2, the nodes #0, #4, and #6 are the master candidate nodes 2, and the nodes #1, #3, #5, #7, #8, and #9 are the non-master nodes 2.

The storage 3 is a storage area accessible from each of the plurality of nodes 2 within the NB 1. For example, the storage 3 may be constituted of storage devices individually provided to the plurality of nodes 2 within the NB 1, and may be a shared file server shared by the plurality of nodes 2.

The node 2 may, for example, store, in the storage 3, a program implementing all or a part of various kinds of functions of the node 2 and various kinds of data. The program may, illustratively, include various kinds of software such as an OS, FW, a driver, MW, and an application program.

Cited as the storage device are, for example, various kinds of storage devices, e.g. a magnetic disk device such as a hard disk drive (HDD), a semiconductor drive device such as an solid state drive (SSD), a nonvolatile memory. Cited as the nonvolatile memory are, for example, a flash memory, and a storage class memory (SCM).

In the storage 3, one or more storage groups may be constructed by using the storage devices provided to the nodes 2 under control of the nodes 2. A redundant arrays of inexpensive disks (RAID) group or RAID groups, for example, are cited as the storage group(s).

Incidentally, the storage 3 may include a storage area provided to the host device 4 by the storage system 10. In this case, the nodes 2 may make various kinds of access such as writing or reading of data or the like to and from the storage 3 or the like in response to a request from the host device 4.

Incidentally, the storage system 10 may be provided with a storage casing including one or more storage devices in addition to or in place of the storage 3 implemented by the storage devices of the nodes 2. In this case, the storage system 10 may provide the host device 4 with a storage area of the storage casing.

The host device 4 is an example of a higher-level device that performs input/output (I/O) such as Read/Write from and to the storage system 10. Cited as the host device 4 are computers such as a server, a personal computer (PC), a tablet, and a personal digital assistant (PDA).

The host device 4 may be coupled to each of at least one of the nodes 2 via a network not illustrated in the figure. The network may include a storage area network (SAN), and may include an intranet such as a local area network (LAN) or a wide area network (WAN), the Internet, and the like. In the example of FIG. 1, there is one host device 4 in the storage system 10. However, there may be a plurality of host devices 4 in the storage system 10.

Incidentally, in the example of FIG. 1, two nodes 2 are provided within one casing (NB 1) for redundancy. However, there is no limitation to this. In addition, the number of pieces of wiring (transmission lines) between the nodes 2, between the nodes 2 and the storage 3, and between the nodes 2 and the host device 4 is not limited to the configuration illustrated in FIG. 1.

An example of hardware configuration of a node 2 will next be described with reference to FIG. 1. As illustrated in FIG. 1, the node 2 may, illustratively, include a central processing unit (CPU) 2a, a memory 2b, an inter-node interface (IF) 2c, an inter-casing IF 2d, a host IF 2e, and a device IF 2f.

The CPU 2a is an example of an arithmetic processing device that performs various kinds of control and operation. The CPU 2a may be mutually communicatably coupled to each of the blocks 2b to 2f by a bus 2g. An integrated circuit (IC) such as an MPU, a DSP, an ASIC, or a PLD (for example, an FPGA) may be used in place of the CPU 2a. Incidentally, the MPU is an abbreviation of a micro processing unit. The DSP is an abbreviation of a digital signal processor. In addition, the ASIC is an abbreviation of the application specific integrated circuit. The PLD is an abbreviation of a programmable logic device. The FPGA is an abbreviation of a field programmable gate array.

The memory 2b is an example of hardware that stores various kinds of data and programs. Cited as the memory 2b are volatile memories such as a random access memory (RAM).

The inter-node IF 2c, the inter-casing IF 2d, the host IF 2e, and the device IF 2f are an example of communication interfaces that perform control and the like of coupling and communication with another node 2 within the NB 1, a node 2 within another NB 1, the host device 4, and the storage 3, individually. Incidentally, the node 2 may be provided with a communication interface that performs control and the like of coupling and communication with a maintenance terminal of a maintenance worker. The node 2 may, for example, download a program implementing all or a part of the various kinds of functions of the node 2 from a network not illustrated in the figure by using the communication interfaces.

Incidentally, the inter-node IF 2c may, for example, include one or more adapters compliant with peripheral component interconnect express (PCIe), and may be coupled to another node 2 within the NB 1 by a bus, a cable, or the like supporting PCIe. In addition, the inter-casing IF 2d may, for example, be a card for scaling out, may include one or more adapters compliant with remote direct memory management (RDMA) over converged Ethernet (RoCE), and may be coupled to a node 2 within another NB 1 by a cable or the like supporting RoCE. Further, the host IF 2e may, for example, be a card for coupling to the host device 4, may include one or more adapters compliant with fibre channel (FC), and may be coupled to the host device 4 by a cable or the like supporting FC. In addition, the device IF 2f may, for example, include one or more adapters compliant with PCIe, and may be coupled to the storage 3 by a bus, a cable, or the like supporting PCIe. Incidentally, a PCIe switch, for example, is cited as the adapter(s) of the device IF 2f.

The above-described hardware configuration of the node 2 is illustrative. Hence, increasing or decreasing of hardware within the node 2 (for example, addition or deletion of an arbitrary block), division, integration in an arbitrary combination, and addition, omission, or the like of a bus may be performed as appropriate.

For example, the node 2 may include a storage device constituting the above-described storage 3.

In addition, in the node 2, at least one of the CPU 2a, the memory 2b, the inter-node IF 2c, the inter-casing IF 2d, the host IF 2e, and the device IF 2f may be made redundant. As an example, the node 2 may include a plurality of CPUs 2a, one or more CPUs 2a may operate as an active system, and the other CPU(s) 2a may not perform processing as a standby system.

Further, the node 2 may include an input-output unit, a reading unit, and the like. The input-output unit may include at least one of an input device such as a mouse, a keyboard, a touch panel, or an operating button and an output device such as a display or a printer.

The reading unit is an example of a reader that reads data or a program recorded on a recording medium, and outputs the data or the program to the CPU 2a. The reading unit may include a coupling terminal or a device to which or into which the recording medium may be coupled or inserted. Cited as the reading unit are an adapter compliant with universal serial bus (USB) or the like, a drive device that accesses a recording disk, and a card reader that accesses a flash memory such as a secure digital (SD) card. Incidentally, the recording medium may store a program implementing all or a part of the various kinds of functions of the node 2.

Cited as the recording medium are, illustratively, non-transitory computer readable recording media such as a magnetic/optical disk and a flash memory. Cited as the magnetic/optical disk are, illustratively, a flexible disk, a compact disc (CD), a digital versatile disc (DVD), a Blu-ray disk, a holographic versatile disc (HVD), and the like. Cited as the flash memory are, illustratively, semiconductor memories such as a USB memory and an SD card. Incidentally, cited as the CD are, illustratively, a CD-read only memory (ROM), a CD-recordable (R), a CD-rewritable (RW), and the like. In addition, cited as the DVD are, illustratively, a DVD-ROM, a DVD-RAM, a DVD-R, a DVD-RW, a DVD+R, a DVD+RW, and the like.

[1-2] One Example of Program Update Procedure in Each Node

Description will next be made of an example of a procedure for updating programs installed on the nodes 2 illustrated in FIG. 1.

Figure 3:
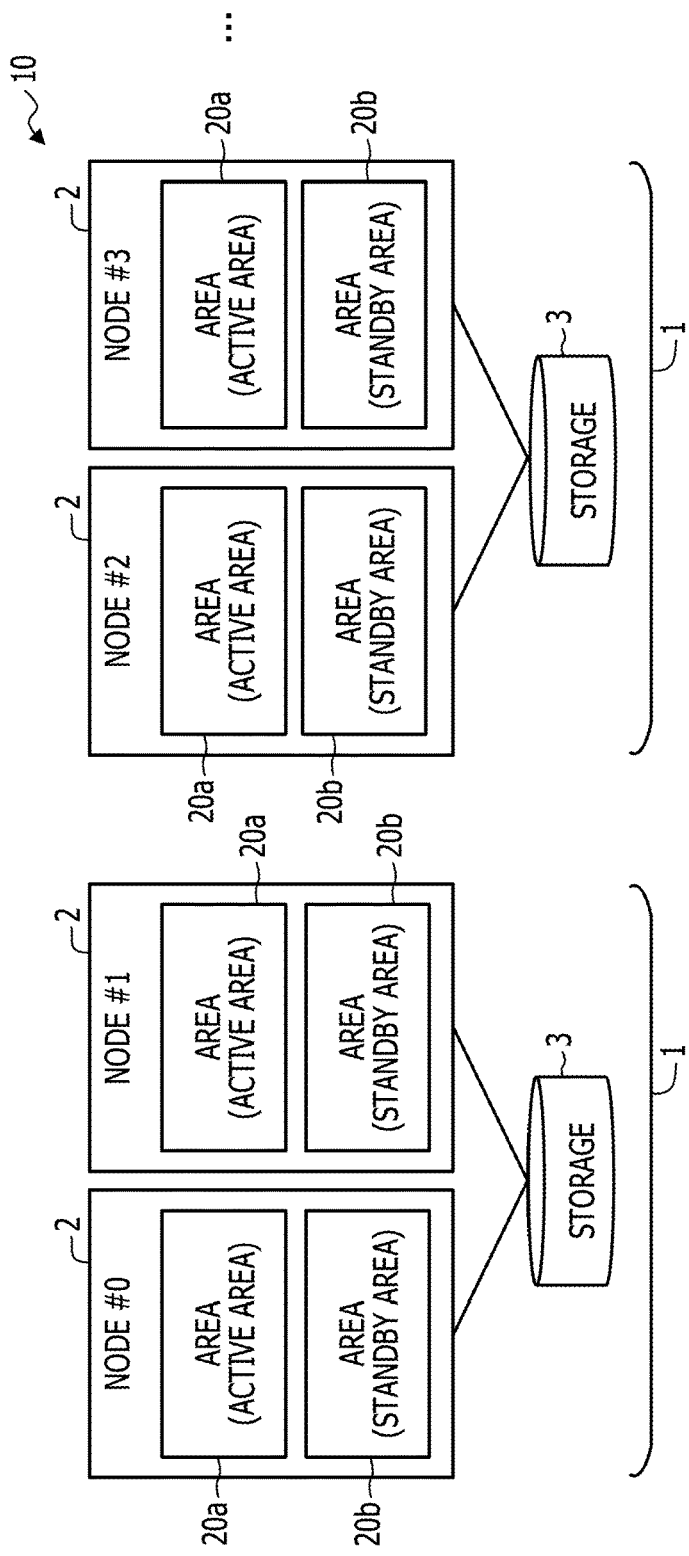
FIG. 3 is a diagram of assistance in explaining active areas and standby areas of nodes.

FIG. 3 is a diagram of assistance in explaining active areas and standby areas of nodes. As illustrated in FIG. 3, each node 2 may include areas 20a and 20b. The areas 20a and 20b are each a storage area in which a program of the node 2, for example, an OS, is installed. The areas 20a and 20b may each be referred to as a "partition." Incidentally, the areas 20a and 20b may be storage areas of the storage device possessed by the node 2, or may be storage areas on the storage 3.

The node 2 boots one of the areas 20a and 20b as a boot area. The boot area may be specified by a boot setting in the node 2. Hereinafter, the area 20a or 20b operated as the boot area will be referred to as an active area, and the area 20a or 20b that is not the boot area will be referred to as a standby area. In the example of FIG. 3, suppose for convenience that the area 20a is the active area, and that the area 20b is the standby area.

Programs of an OS or the like of versions different from each other may be installed in the areas 20a and 20b. Thus providing the plurality of areas (two areas in the example of FIG. 3) in which the programs are installed enables the node 2 to manage the plurality of versions.

The following description will be made of an example of a procedure in a case where the programs installed on the plurality of nodes 2 are updated in the storage system 10 illustrated in FIG. 3.

(i) Software Registration Processing

A maintenance worker installs update versions of software in the standby areas (areas 20b in the example of FIG. 3) of all of the nodes 2.

(ii) Software Application Processing (ii-1) The maintenance worker makes, for each node 2, a setting that switches the boot area from the present active area (area 20a in the example of FIG. 3) to the standby area (area 20b in the example of FIG. 3). Thus, the node 2 boots in the present standby area (area 20b in the example of FIG. 3) at a time of a next boot.

(ii-2) The maintenance worker copies, for each node 2, the setting file of the node 2 from the present active area (area 20a in the example of FIG. 3) to the standby area (area 20b in the example of FIG. 3). Incidentally, the setting file is various kinds of setting information related to a device configuration, such as the internet protocol (IP) address of the node 2 itself.

(ii-3) The maintenance worker restarts each node 2. It is to be noted that after the restart, in each node 2, the area 20b is the active area, and the area 20a is the standby area.

In a case where an update by the above-described existing method is applied to FIG. 3, for example, the above-described processing of (i) is performed as work in advance by the maintenance worker via a maintenance terminal, and the above-described processing of (ii) is performed sequentially for each node 2 on a one-by-one basis as work on the day of the update by the maintenance worker.

On the other hand, in the storage system 10 according to one embodiment, program update is performed for the plurality of nodes 2 collectively (for example, in parallel), instead of the program update being performed sequentially for each node on a one-by-one basis.

Incidentally, as described above, fault tolerance is improved by achieving redundancy of the nodes 2 so that at least one node 2 may operate as an active system in each NB 1. Because of such a device configuration, when all of the nodes 2 within a same NB 1 are collectively set as a program update target, the nodes 2 within the NB 1 are restarted simultaneously or substantially simultaneously, and therefore the operation of the NB 1 is stopped.

Accordingly, in one embodiment, program update is first performed for a part of the plurality of nodes 2 (for example, one node 2 when there are two nodes 2) within each NB 1, and program update is thereafter performed for the other node(s) 2.

For example, in one embodiment, all of the nodes 2 are divided into a plurality of (for example, two) update groups (that may hereinafter be denoted simply as "groups"), and the above-described processing of (ii) is performed for each group. Hereinafter, for convenience, a group in which the above-described processing of (ii) is performed first will be denoted as a "first half group" or a "first update group," and a group in which the above-described processing of (ii) is subsequently performed will be denoted as a "second half group" or a "second update group."

In addition, after the update of programs of all the nodes 2 within a certain group, a restart of these nodes 2 occurs. In a case where there are less than two master nodes 2 or two master candidate nodes 2 included in another group, for example, there is temporarily no failover destination of the master node 2 in the other group until completion of the update and the restart in the certain group.

Accordingly, in one embodiment, the nodes 2 to be allocated to each group are selected such that a sum of the number of the master node 2 and master candidate nodes 2 is "two or more" in each of the plurality of groups.

Incidentally, in a case where the number of nodes 2 included in the storage system 10 divided by the number of groups is smaller than "2," the nodes 2 to be included in each group may be selected such that a sum of the number of the master node 2 and master candidate nodes 2 is "1."

[1-3] One Example of Node Selecting Method

An example of a node selecting method will be described in the following. Incidentally, in the following description, suppose that the storage system 10 has ten nodes 2, that a sum of the number of the master node 2 and master candidate nodes 2 in the storage system 10 is equal to or more than "4," and that all of the nodes 2 are divided into two groups.

As described above, the master node 2 in the storage system 10 determines master candidate nodes 2 in given timing such as a time of a start of the storage system 10.

In one embodiment, attention is directed to the fact that the master node 2 determines master candidate nodes 2, and the master node 2 determines master candidate nodes 2 from the plurality of nodes 2 such that the master candidate nodes 2 are equally distributed to each group by group selecting logic determined in advance.

In a case where there are n nodes 2 as the master node 2 and master candidate nodes 2 (n is an integer of four or more) (the number of master candidate nodes 2 is n−1), for example, two or more and n−2 or fewer nodes 2 among the n nodes 2 are included in the first half group (first update group). Incidentally, in a case where n is an integer equal to or less than three, it suffices to include one or more and n−1 or fewer nodes 2 among the n nodes 2 in the first half group (first update group).

Description will be made of, as an example, a case where the group selecting logic (selection condition) is a condition that nodes 2 having even node numbers be determined as the first half group and nodes 2 having odd node numbers be determined as the second half group. Incidentally, the group selecting logic may include a condition that the present master node 2 not be included in the first half group. This is because the present master node 2 gives an update instruction and the like to the first half group.

Figure 4:
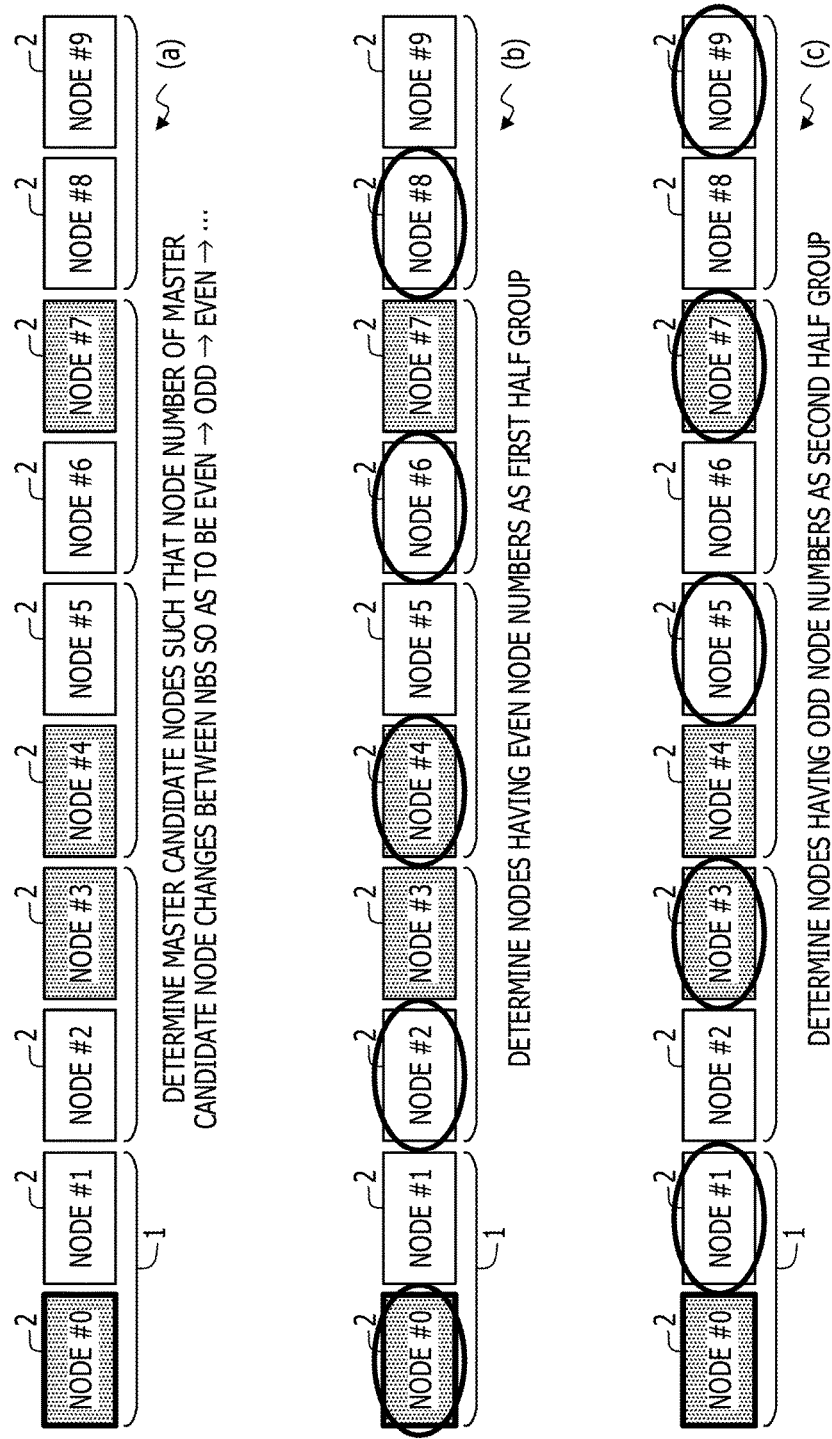
FIG. 4 is a diagram illustrating an example of selecting nodes according to one embodiment.

FIG. 4 is a diagram illustrating an example of selecting nodes according to one embodiment. For example, as indicated by a symbol (a) in FIG. 4, the master node 2 may determine master candidate nodes 2 such that the node number of a master candidate node 2 starts with an even number or an odd number in each NB 1, and such that a change is made between the even number and the odd number alternately. In the example of the symbol (a) in FIG. 4, the node #0 (even number) as the master node 2 determines the node #3 (odd number), the node #4 (even number), and the node #7 (odd number) as the master candidate nodes 2.

In this case, as indicated by a symbol (b) in FIG. 4, the node #0 (master node 2), the node #4 (master candidate node 2), and the nodes #2, #6, and #8 (non-master nodes 2) are selected as the first half group. In addition, as indicated by a symbol (c) in FIG. 4, the nodes #3 and #7 (master candidate nodes 2) and the nodes #1, #5, and #9 (non-master nodes 2) are selected as the second half group. As indicated by the symbols (b) and (c) in FIG. 4, in both the first half group and the second half group, a sum of the number of the master node 2 and master candidate nodes 2 is "2," and it is therefore possible to secure a candidate for a failover destination at a time of a fault in the master node 2.

Incidentally, the above-described node selection processing may be performed in given timing such as a time of a start of the storage system 10 or a time of an update request from the maintenance terminal or the like. The master candidate nodes 2 determined by the master node 2 may be a failover destination of the master node 2 in the operation of the storage system 10.

Alternatively, the master candidate nodes 2 selected by the above-described node selection processing may be temporary master candidate nodes 2 that are valid in a period of the processing of updating the nodes 2. In this case, normal master candidate nodes 2 that may be a failover destination of the master node 2 in the operation of the storage system 10 may be determined separately from the master candidate nodes 2 selected by the node selection processing (in given timing such as a time of a start). Incidentally, in this case, the node selection processing may be performed before a start of the update.

For example, after completion of the update and restart of the nodes 2, the master candidate nodes 2 determined by the node selection processing may become invalid, and the normal master candidate nodes 2 may become valid.

Incidentally, it has been assumed thus far that the master node 2 performs the node selection processing. However, there is no limitation to this, and one of the plurality of nodes 2 in the storage system 10 may perform the node selection processing.

When nodes 2 within each NB 1 are updated in parallel on one side at a time, as described above, update work may be completed in an update time of two updates, and therefore an increase in maintenance time may be solved.

In addition, performing update in parallel causes a risk of there being no failover destination of the master node 2. However, redundancy within each update group may be maintained by determining the master candidate nodes 2 based on the group selecting logic.

Hence, the nodes 2 may be updated easily as compared with the case where update is performed sequentially on a one-by-one basis as in the existing method.

[1-4] Example of Functional Configuration of Node

Figure 5:
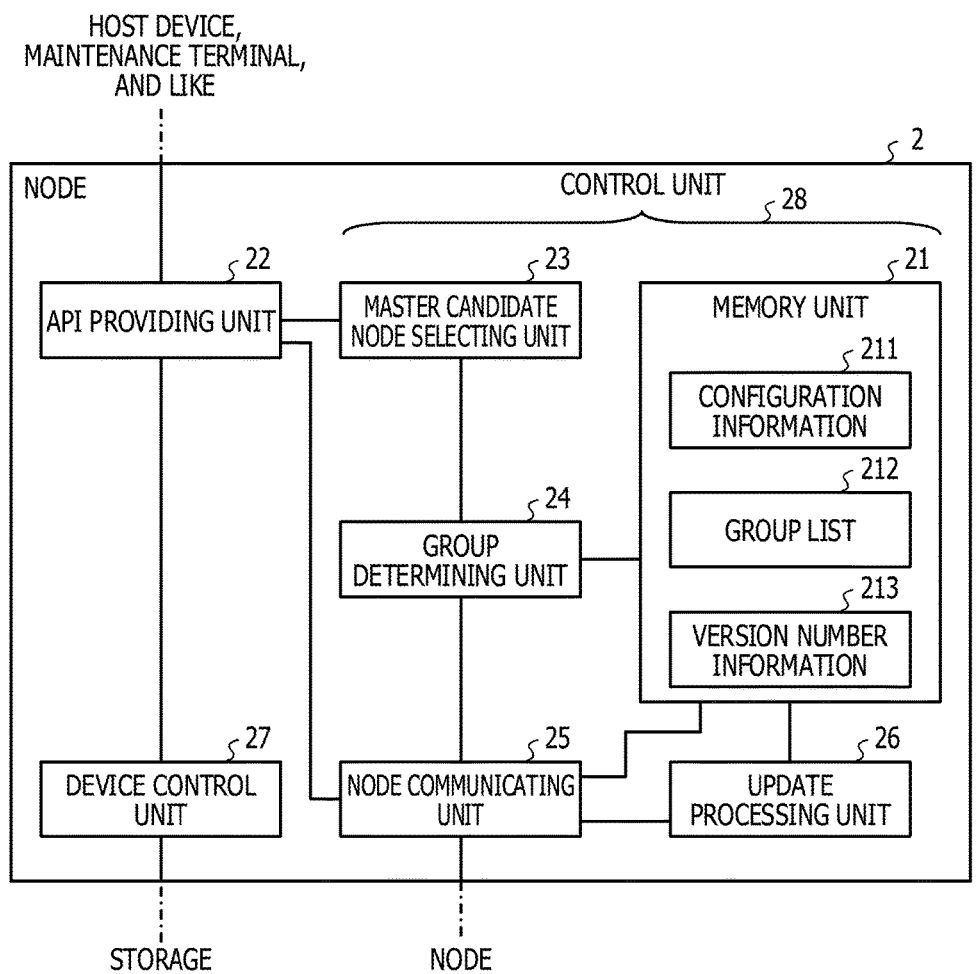
FIG. 5 is a block diagram illustrating an example of functional configuration of a node according to one embodiment.

An example of functional configuration of a node 2 will next be described. FIG. 5 is a diagram illustrating an example of a functional configuration of the node 2. As illustrated in FIG. 5, the node 2 may, illustratively, include a memory unit 21, an application programming interface (API) providing unit 22, a master candidate node selecting unit 23, a group determining unit 24, a node communicating unit 25, an update processing unit 26, and a device control unit 27.

Incidentally, the respective functions of the API providing unit 22 to the device control unit 27 may, for example, be implemented by the CPU 2a illustrated in FIG. 1 by expanding and executing, in the memory 2b, a program stored in a storage device not illustrated in the figures or the storage 3. Incidentally, the memory unit 21 and the master candidate node selecting unit 23 to the update processing unit 26 may be positioned as a control unit 28 that controls the update of software applied to each of the plurality of nodes 2.

The memory unit 21 may store various kinds of information related to the processing of the node 2. The memory unit 21 may, for example, be implemented by a storage area of the memory 2b illustrated in FIG. 1.

As illustrated in FIG. 5, the memory unit 21 may, illustratively, store the information of configuration information 211, a group list 212, and version number information 213. Incidentally, in the following description, the various kinds of information stored by the memory unit 21 are illustrated in formats suitable for description. However, these pieces of information are not limited to the illustrated formats, and may be managed in various formats or modes such as an array, a database (DB), and a bit map. Incidentally, these pieces of information 211 to 213 stored by the memory unit 21 will be described later.

The API providing unit 22 provides a user interface such as an API to the host device 4, the maintenance terminal, and the like. For example, the API providing unit 22 is an example of a receiving unit accessed from the host device 4 or the maintenance terminal.

The master candidate node selecting unit 23 selects master candidate nodes 2 in given timing such as a time of a start of the storage system 10 (nodes 2) or a time of reception of a request from the maintenance terminal. A method of selecting the master candidate nodes 2 has already been described, and therefore detailed description thereof will be omitted.

FIG. 6 is a diagram illustrating an example of configuration information. Incidentally, the master candidate node selecting unit 23 may, for example, select master candidate nodes 2 based on relation between the NBs 1 and the nodes 2, the relation being indicated by the configuration information 211 illustrated in FIG. 6, and the group selecting logic. Incidentally, information on the selected master candidate nodes 2 may be set in the configuration information 211, for example.

Thus, the master candidate node selecting unit 23 is an example of a device managing unit that assigns a role of performing control related to the storage system 10 to n−1 nodes 2 selected among the plurality of nodes 2 based on the group selecting logic.

Figure 7:
FIG. 7 is a diagram illustrating an example of a group list.

The group determining unit 24 determines groups to which respective nodes 2 are assigned in the storage system 10 according to the group selecting logic determined in advance. In one embodiment, the group determining unit 24 may determine the nodes 2 having even node numbers as the first half group, and determine the nodes 2 having odd node numbers as the second half group. FIG. 7 is a diagram illustrating an example of a group list. Incidentally, information on the determined update groups may, for example, be stored as the group list 212 illustrated in FIG. 7 in the memory unit 21.

Thus, the group determining unit 24 is an example of an assigning unit that selects nodes 2 one by one from each of the plurality of redundant groups based on the group selecting logic, and assigns the plurality of selected nodes 2 to the first half group.

Incidentally, the group determining unit 24 as an example of the assigning unit may assign the nodes 2 not selected in each of the plurality of redundant groups to the second half group.

The node communicating unit 25 communicates with another node 2 within the NB 1 or a node 2 within another NB 1. The node communicating unit 25 may, for example, transmit an update execution instruction (software application processing request) to each of the plurality of nodes 2 included in an update target group. In addition, when the node communicating unit 25 is notified of completion of update from each of the plurality of nodes 2 included in the update target group, the node communicating unit 25 may update the version number information 213 of each node 2.

FIG. 8 is a diagram illustrating an example of version number information. Incidentally, the version number information 213 illustrated in FIG. 8 may be FW version number information of each node 2 in the whole of the storage system 10, and may, for example, be information managed by the master node 2. On the other hand, the master candidate node 2 and the non-master nodes 2 may manage FW version number information of the nodes 2 themselves as the version number information 213.

Thus, the node communicating unit 25 is an example of a transmitting unit that transmits, to each of the plurality of nodes 2 belonging to the first half group, an instruction to update software applied to the nodes 2.

Incidentally, the processing of the master candidate node selecting unit 23, the group determining unit 24, and the node communicating unit 25 described above may be processing performed by a node 2 performing the node selection processing, for example, the master node 2.

The update processing unit 26 performs processing of updating the program installed on the node 2 itself based on the update execution instruction received via the node communicating unit 25. Incidentally, suppose that, as an example, the maintenance terminal installs an update version of program in the standby area 20b (see FIG. 3) of each node 2 via the API providing unit 22 before the update processing by the update processing unit 26.

For example, in the update processing, the update processing unit 26 may copy the setting file of the node 2 from the active area 20a to the standby area 20b (see FIG. 3), switch the boot area from the active area 20a to the standby area 20b, and then restart the node 2.

Thus, the node 2 boots according to the update version of program installed in the area 20b in advance. Incidentally, when the boot of the node 2 according to the update version of program is completed, the update processing unit 26 may update the version number information 213 related to the own node 2, and return, via the node communicating unit 25, a completion response to the node 2 that transmitted the update execution instruction.

Incidentally, the node 2 receiving completion responses from all of the nodes 2 in the first half group, for example, the master node 2, may transfer functions (rights) of the master node 2 itself to one of the master candidate nodes 2 in the first half group after completion of update in the first half group.

The master node 2 (former master candidate node 2) of the first half group to which master node the rights are transferred may transmit, to each of the nodes 2 belonging to the second half group including the former master node 2, an instruction to update software applied to the nodes 2.

Incidentally, the device control unit 27 performs various kinds of control on the storage 3 (or another storage device). As an example, the device control unit 27 may perform various kinds of access control in response to a request to access the storage 3 (or the other storage device), the request being received from the host device 4 via the API providing unit 22. The processing of the device control unit 27 may be performed by various known methods, and detailed description thereof will be omitted.

[1-5] Operation Example

Figure 9B:
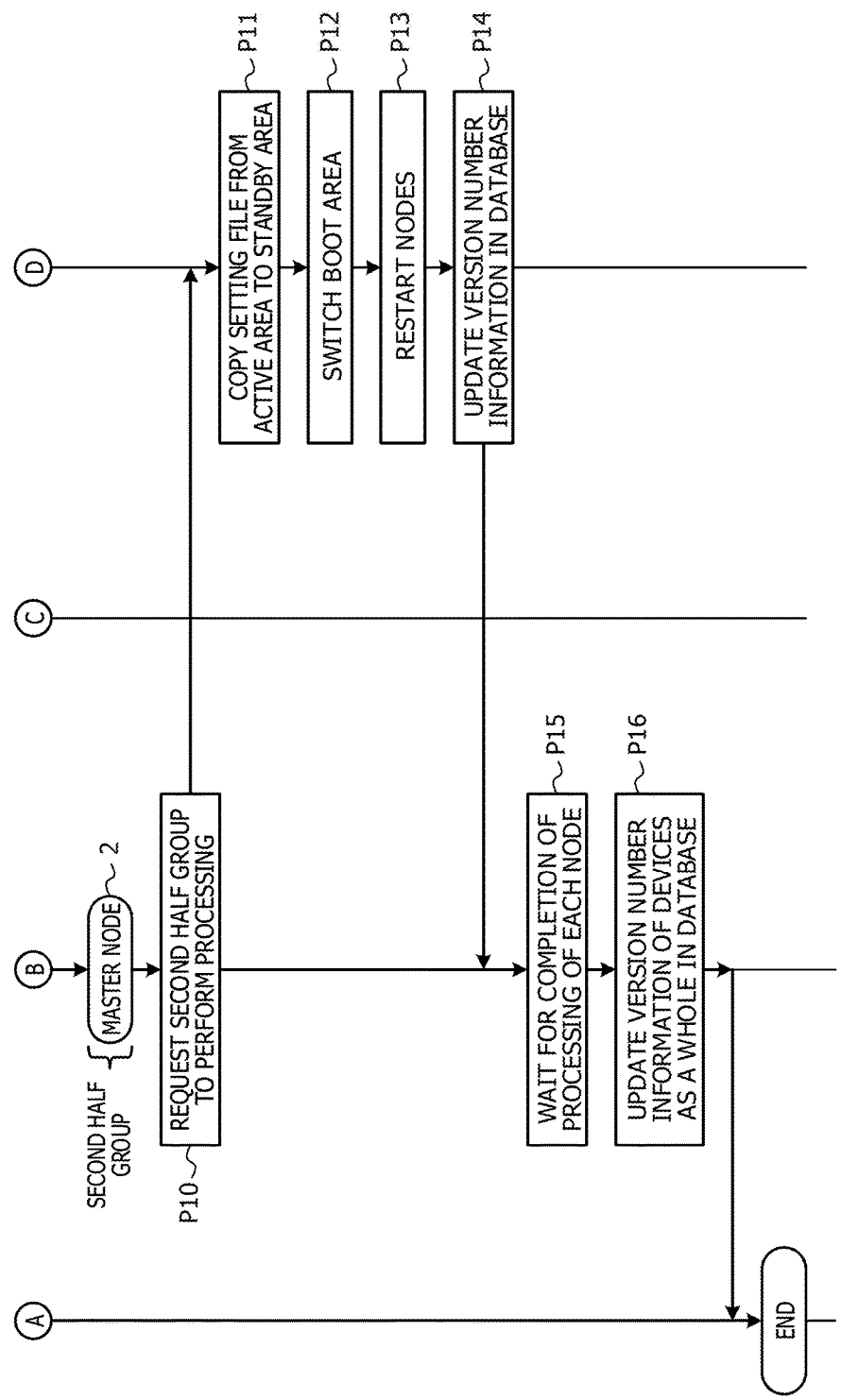

FIG. 9 (i.e. FIGS. 9A and 9B) is a diagram illustrating an example of an operation sequence of program update processing for a plurality of nodes in a storage system according to one embodiment. The nodes in the storage system described with reference to FIG. 9 may be the nodes 2 in the storage system 10 illustrated in FIG. 1. Incidentally, as a precondition, suppose that the maintenance terminal installs an update version of program in the standby area 20b of each node 2 in advance via the API providing unit 22. In addition, in the following description, suppose that the master node 2 performs the node selection processing.

As illustrated in FIG. 9, when a software application request is transmitted from the host device 4 to the API providing unit 22 of the master node 2 (processing P1), the master node 2 performs the node selection processing for each update group (processing P2). Incidentally, suppose that the master node 2 itself is selected as a node 2 of the second half group in processing P2.

The master node 2 transmits a software application processing request to each of nodes 2 selected as the first half group in processing P2 via the node communicating unit 25 (processing P3).

The update processing unit 26 of each of master candidate nodes 2 and non-master nodes 2 selected as the first half group copies the setting file from the active area 20a to the standby area 20b (processing P4), and switches the boot area from the active area 20a to the standby area 20b (processing P5).

Then, the update processing unit 26 of each of the master candidate nodes 2 and the non-master nodes 2 restarts the own node 2 (processing P6), updates the version number information 213 in a database (processing P7), and transmits a response indicating completion to the master node 2 via the node communicating unit 25.

The master node 2 waits for completion of processing of each of the nodes 2 in the first half group (processing P8). When the processing of all of the nodes 2 in the first half group is completed, the master node 2 switches the master node 2 to one of the master candidate nodes 2 in the first half group (processing P9).

The node 2 promoted to the master node 2 transmits a software application processing request to each of nodes 2 selected as the second half group in processing P2 via the node communicating unit 25 (processing P10).

The update processing unit 26 of each of master candidate nodes 2 and non-master nodes 2 selected as the second half group copies the setting file from the active area 20a to the standby area 20b (processing P11), and switches the boot area from the active area 20a to the standby area 20b (processing P12).

Then, the update processing unit 26 of each of the master candidate nodes 2 and the non-master nodes 2 restarts the own node 2 (processing P13), updates the version number information 213 in a database (processing P14), and transmits a response indicating completion to the master node 2 via the node communicating unit 25.

The master node 2 waits for completion of processing of each of the nodes 2 in the second half group (processing P15). When the processing of all of the nodes 2 in the second half group is completed, the master node 2 updates the version number information 213 of the devices as a whole in a database (processing P16), and transmits a response indicating completion to the host device 4.

Figure 10A:
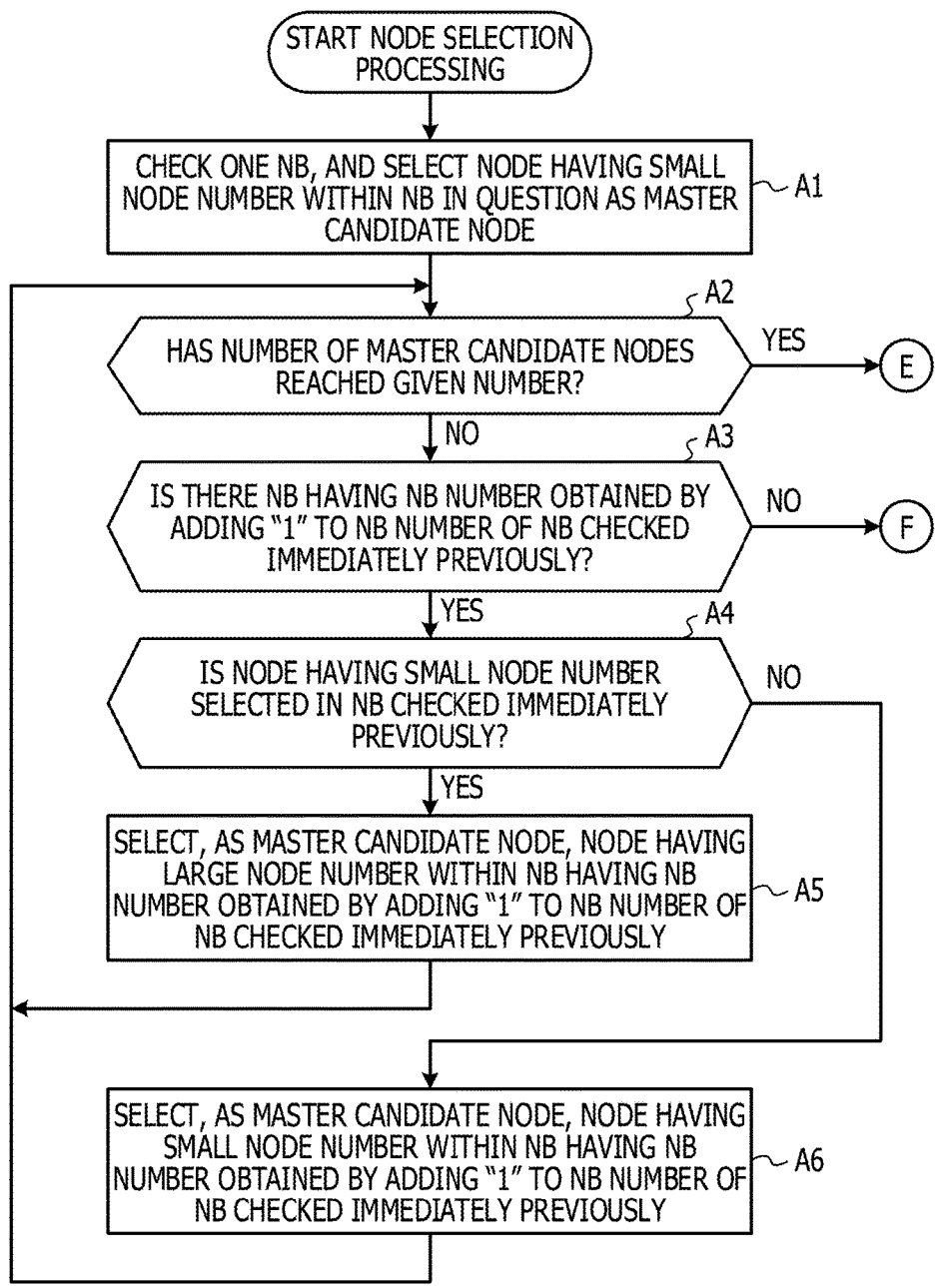
FIGS. 10A and 10B are a diagram illustrating an example of an operation flow of node selection processing illustrated in FIGS. 9A and 9B.
Figure 10B:
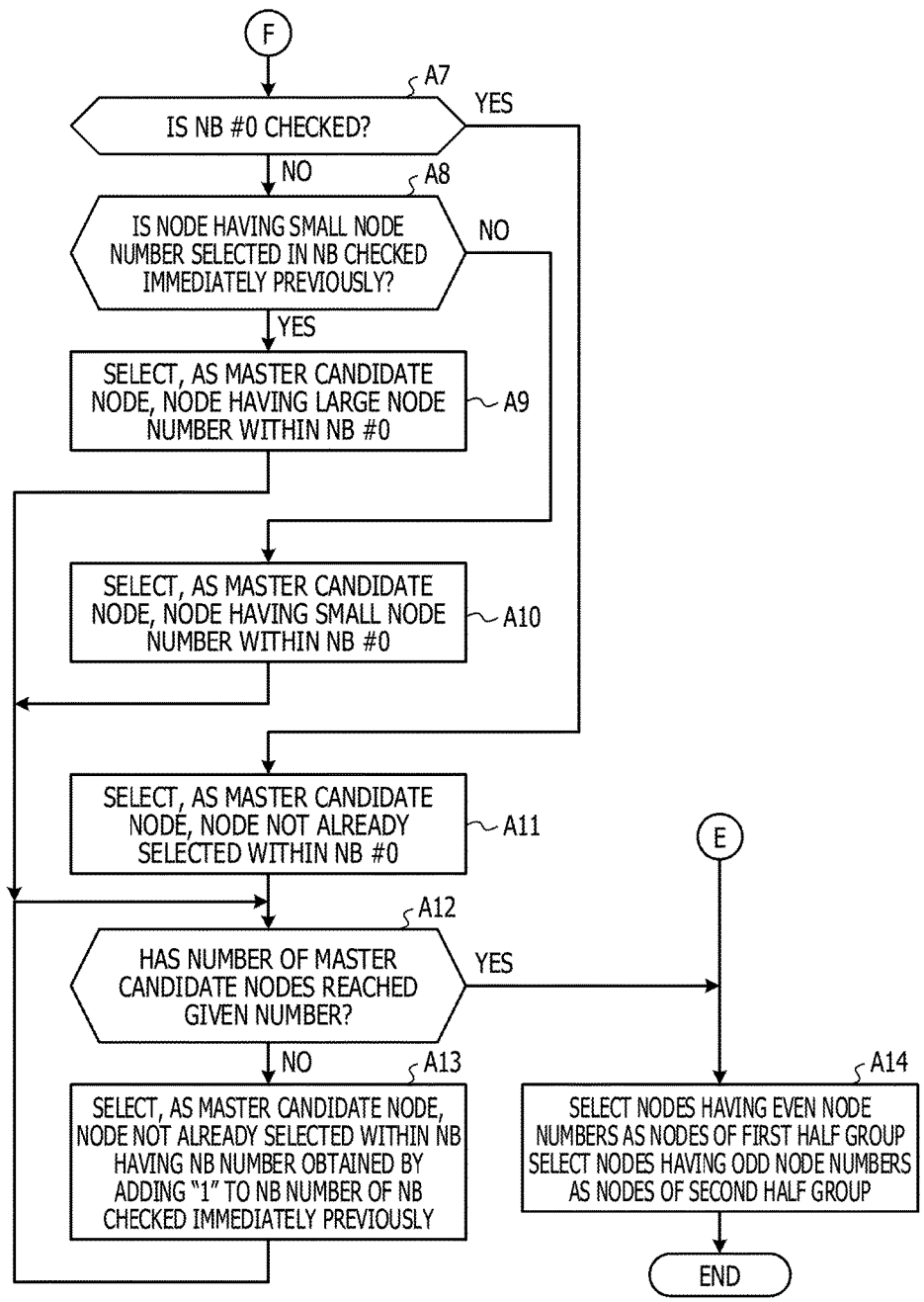

Next, referring to FIG. 10 (i.e. FIGS. 10A and 10B), description will be made of an example of operation of the node selection processing in processing P2 in FIG. 9.

As illustrated in FIG. 10, the master candidate node selecting unit 23 of a node 2, for example, the master node 2, checks one NB 1 by referring to the configuration information 211, and selects a node 2 having a small node number within the NB 1 as a master candidate node 2 (processing A1).

The master candidate node selecting unit 23 determines whether or not the number of master candidate nodes 2 has reached a given number (processing A2). When the number of master candidate nodes 2 has reached the given number (Yes in processing A2), the processing proceeds to processing A14.

When the number of master candidate nodes 2 has not reached the given number (No in processing A2), on the other hand, the master candidate node selecting unit 23 determines whether or not there is an NB 1 having a node number obtained by adding "1" to the node number of the NB 1 checked immediately previously (processing A3).

When there is an NB 1 having the NB number obtained by adding "1" to the NB number of the NB 1 checked immediately previously (Yes in processing A3), the master candidate node selecting unit 23 determines whether or not a node 2 having a small node number is selected in the NB 1 checked immediately previously (processing A4).

When a node 2 having a small node number is selected (Yes in processing A4), the processing proceeds to processing A5. In processing A5, the master candidate node selecting unit 23 selects, as a master candidate node 2, a node 2 having a large node number within the NB 1 having the NB number obtained by adding "1" to the NB number of the NB 1 checked immediately previously. The processing then proceeds to processing A2.

When a node 2 having a small node number is not selected (No in processing A4), the processing proceeds to processing A6. In processing A6, the master candidate node selecting unit 23 selects, as a master candidate node 2, a node 2 having a small node number within the NB 1 having the NB number obtained by adding "1" to the NB number of the NB 1 checked immediately previously. The processing then proceeds to processing A2.

When there is no NB 1 having the NB number obtained by adding "1" to the NB number of the NB 1 checked immediately previously in processing A3 (No in processing A3), on the other hand, the master candidate node selecting unit 23 determines whether or not the NB #0 is checked by referring to the configuration information 211 (processing A7).

When the NB #0 is not checked (No in processing A7), the master candidate node selecting unit 23 determines whether or not a node 2 having a small node number is selected in the NB 1 checked immediately previously (processing A8).

When a node 2 having a small node number is selected (Yes in processing A8), the processing proceeds to processing A9. In processing A9, the master candidate node selecting unit 23 selects, as a master candidate node 2, a node 2 having a large node number within the NB #0. The processing then proceeds to processing A12.

When a node 2 having a small node number is not selected (No in processing A8), the processing proceeds to processing A10. In processing A10, the master candidate node selecting unit 23 selects, as a master candidate node 2, a node 2 having a small node number within the NB #0. The processing then proceeds to processing A12.

When it is determined in processing A7 that the NB #0 is checked (Yes in processing A7), the master candidate node selecting unit 23 selects, as a master candidate node 2, a node 2 not already selected within the NB 1 (processing A11).

Then, the master candidate node selecting unit 23 determines whether or not the number of master candidate nodes 2 has reached the given number (processing A12). When the number of master candidate nodes 2 has not reached the given number (No in processing A12), the processing proceeds to processing A13. In processing A13, the master candidate node selecting unit 23 selects, as a master candidate node 2, a node 2 not already selected within an NB 1 having an NB number obtained by adding "1" to the NB number of the NB 1 checked immediately previously. The processing then proceeds to processing A12.

When the number of master candidate nodes 2 has reached the given number (Yes in processing A12), on the other hand, the processing proceeds to processing A14.

In processing A14, the group determining unit 24 selects nodes 2 having even node numbers as the nodes 2 of the first half group, and selects nodes 2 having odd node numbers as the nodes 2 of the second half group. The processing is then ended.

[1-6] Modification

The node selection processing according to one embodiment may be modified and performed as follows.

In a modification, the master candidate node selecting unit 23 may not select master candidate nodes 2 for the node selection processing. Incidentally, the master candidate node selecting unit 23 may select normal master candidate nodes 2 at a time of a start of the nodes 2 or the like.

The group determining unit 24 determines groups to which respective nodes 2 are assigned in the storage system 10 according to the following group selecting logic and based on the configuration information 211, for example.

The group selecting logic may include the following determination for each NB 1. Incidentally, the following example represents a case where nodes 2 to be assigned to the first half group are selected. It suffices to select nodes 2 not selected as the first half group as nodes 2 to be assigned to the second half group.

(I) In the NB 1 including the master node 2, a node 2 that is not the master node 2 is selected.

(II) In a case of an NB 1 other than the NB 1 including the master node 2, one node 2 within the NB 1 is selected according to the following condition. At this time, when a master candidate node 2 is selected, a master candidate selection completion counter (hereinafter represented simply as a "counter") is incremented by "1."

(II-1) In a case where there is a master candidate node 2 and the counter has not reached a threshold value, the master candidate node 2 is selected. At this time, when there are a plurality of master candidate nodes 2 within the NB 1, a master candidate node 2 having a lowest number (small node number) is selected. Incidentally, the threshold value may, for example, be obtained by dividing a total number of master candidate nodes 2 in the storage system 10 by the number of groups.

(II-2) In a case where there is a master candidate node 2 and the counter has reached the threshold value, selection of master candidate nodes 2 is completed, and therefore a node 2 (non-master node 2) that is not the master candidate node 2 is selected.

(II-3) In a case where there is no master candidate node 2, a non-master node 2 having a lowest number (small node number) within the NB 1 is selected.

Figure 11:
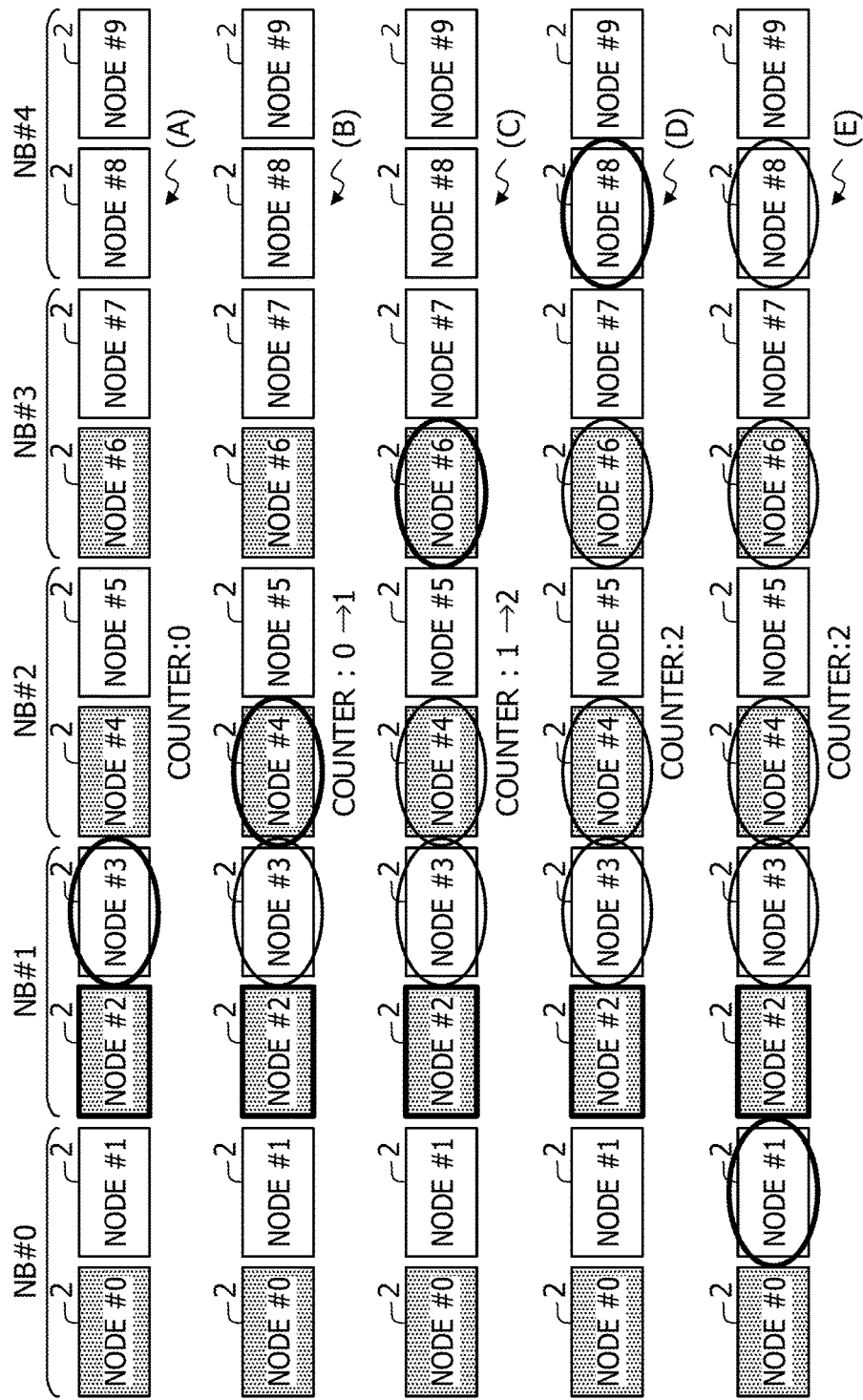
FIG. 11 is a diagram illustrating an example of selecting nodes to be included in a first half group according to a modification.

FIG. 11 is a diagram illustrating an example of selecting nodes to be included in a first half group according to a modification. The nodes illustrated in FIG. 11 may be the nodes 2 illustrated in FIG. 1. In the example of FIG. 11, suppose that the storage system 10 has five NBs 1, NBs #0 to #4, and there are two nodes 2 in each NB 1. In addition, suppose that a node #2 in the NB #1 is the master node 2, and that a sum of the number of the master node 2 and master candidate nodes 2 is four. Incidentally, the threshold value of the counter is the total number "4" of master candidate nodes 2 divided by the number "2" of groups, and is thus "2."

As indicated by a symbol (A) in FIG. 11, the group determining unit 24, for example, checks the NB #1. The master node #2 is present in the NB #1. The group determining unit 24 therefore selects a node #3 that is not the master node #2 according to (I) of the group selecting logic (see the node 2 to which an ellipse is added in FIG. 11). Incidentally, at this time, the counter is "0".

As indicated by a symbol (B) in FIG. 11, the group determining unit 24, for example, checks the NB #2 as the NB 1 following the NB #1. A master candidate node #4 is present in the NB #2, and the counter is "0"<Threshold Value "2." Therefore, the group determining unit 24 selects the master candidate node #4 according to (II-1) of the group selecting logic, and sets the counter to "1" by adding "1" to the counter.

As indicated by a symbol (C) in FIG. 11, the group determining unit 24, for example, checks the NB #3 as the NB 1 following the NB #2. A master candidate node #6 is present in the NB #3, and the counter is "1"<Threshold Value "2." Therefore, the group determining unit 24 selects the master candidate node #6 according to (II-1) of the group selecting logic, and sets the counter to "2" by adding "1" to the counter.

As indicated by a symbol (D) in FIG. 11, the group determining unit 24, for example, checks the NB #4 as the NB 1 following the NB #3. There is no master candidate node 2 in the NB #4. Therefore, the group determining unit 24 selects a node #8 having a lowest number within the NB #4 according to (II-3) of the group selecting logic.

As indicated by a symbol (E) in FIG. 11, because there is no NB 1 following the NB #4, the group determining unit 24, for example, checks the NB #0. A master candidate node #0 is present in the NB #0, and the counter is "2"=Threshold Value "2." Therefore, the group determining unit 24 selects a node #1, which is not the master candidate node #0, according to (II-2) of the group selecting logic.

As a result of the above, checking of all of the NBs 1 is ended, and therefore selection of the nodes 2 to be included in the first half group by the group determining unit 24 is ended. Thus, the group determining unit 24 selects the nodes #1, #3, #4, #6, and #8 including the two master candidate nodes 2 (nodes #4 and #6) as the first half group (see the symbol (E) in FIG. 11).

In addition, the group determining unit 24 selects, as the second half group, remaining nodes #0, #2, #5, #7, and #9 not included in the first half group. The second half group includes two nodes 2 as the master node 2 and a master candidate node 2 (nodes #0 and #2).

As described above, the modification of one embodiment may produce effects similar to those of one embodiment.

In addition, according to the modification, selection of the nodes 2 to be assigned to each update group may be performed flexibly without depending on the arrangement of the master node 2 and master candidate nodes 2 in the storage system 10.

Next, referring to FIG. 12, description will be made of an example of operation of the node selection processing according to the modification. Incidentally, the processing illustrated in FIG. 12 may be performed in processing P2 illustrated in FIG. 9, and may be performed in place of the node selection processing according to one embodiment, the node selection processing according to one embodiment being illustrated in FIG. 10.

Figure 12:
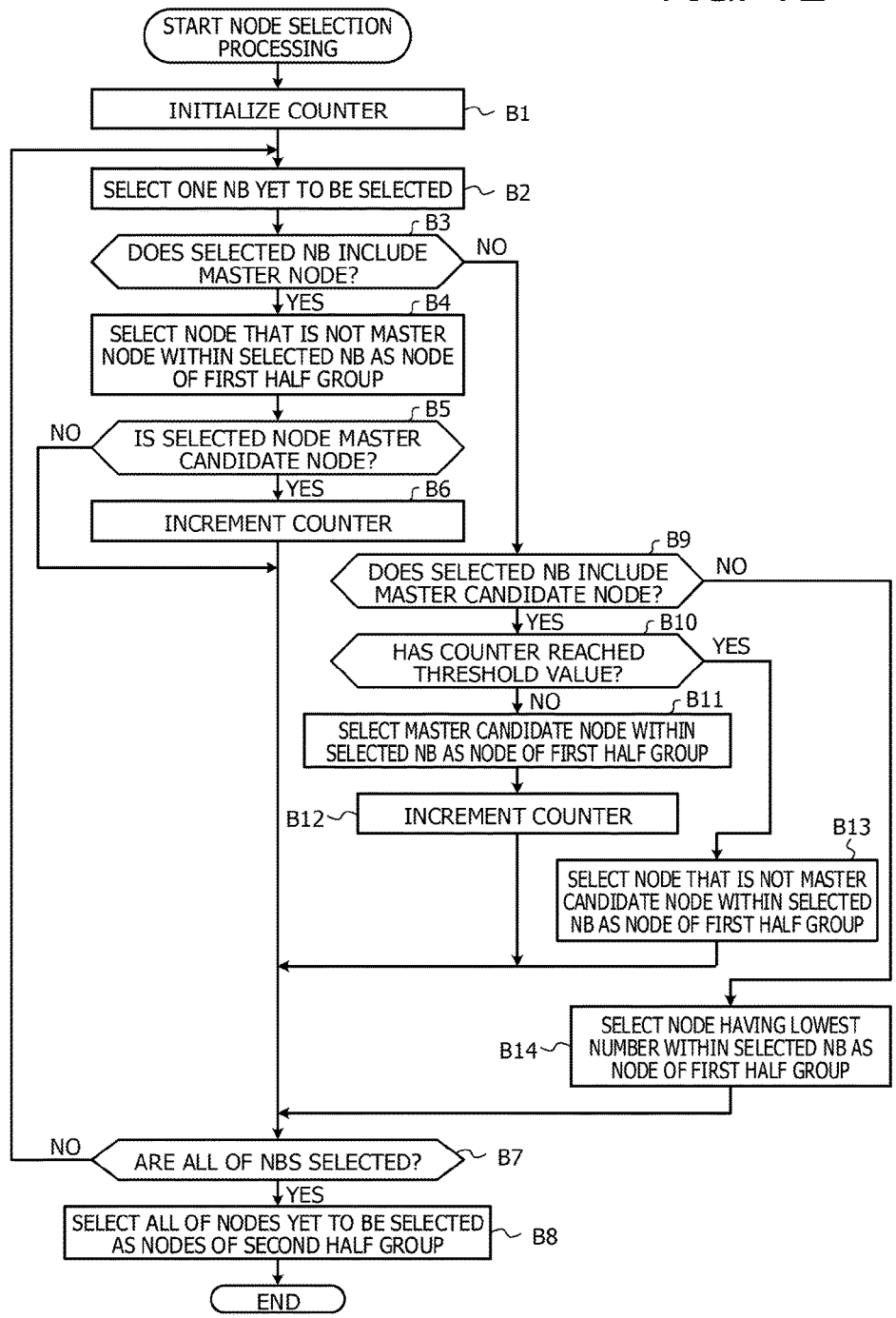
FIG. 12 is a diagram illustrating a modification of the operation flow of the node selection processing illustrated in FIGS. 9A and 9B.

As illustrated in FIG. 12, the group determining unit 24 of a node 2, for example, the master node 2, initializes the counter (for example, sets "0") (processing B1), and selects one NB 1 yet to be selected in the storage system 10 (processing B2).

Next, the group determining unit 24 determines whether or not the selected NB 1 includes the master node 2 (processing B3). When the selected NB 1 includes the master node 2 (Yes in processing B3), the group determining unit 24 selects, as a node 2 of the first half group, a node 2 that is not the master node 2 within the selected NB 1 (processing B4).

The group determining unit 24 determines whether or not the selected node 2 is a master candidate node 2 (processing B5). When the selected node 2 is not a master candidate node 2 (No in processing B5), the processing proceeds to processing B7. When the selected node 2 is a master candidate node 2 (Yes in processing B5), on the other hand, the group determining unit 24 increments the counter (processing B6), and determines whether or not all of the NBs 1 are selected (processing B7).

When not all of the NBs 1 are selected (No in processing B7), the processing proceeds to processing B2. When all of the NBs 1 are selected (Yes in processing B7), on the other hand, the group determining unit 24 selects all of nodes 2 yet to be selected as the nodes 2 of the second half group (processing B8). The processing is then ended.

When the selected NB 1 does not include the master node 2 in processing B3 (No in processing B3), the group determining unit 24 determines whether or not the selected NB 1 includes a master candidate node 2 (processing B9).

When the selected NB 1 includes a master candidate node 2 (Yes in processing B9), the group determining unit 24 determines whether or not the counter has reached the threshold value (processing B10). When the counter has not reached the threshold value (No in processing B10), the group determining unit 24 selects the master candidate node 2 within the selected NB 1 as a node 2 of the first half group (processing B11), and increments the counter (processing B12). The processing then proceeds to processing B7.

When the counter has reached the threshold value in processing B10 (Yes in processing B10), the group determining unit 24 selects a node 2 that is not the master candidate node 2 within the selected NB 1 as a node 2 of the first half group (processing B13). The processing then proceeds to processing B7.

In addition, when the selected NB 1 does not include a master candidate node 2 in processing B9 (No in processing B9), the group determining unit 24 selects a node 2 having a lowest number within the selected NB 1 as a node 2 of the first half group (processing B14). The processing then proceeds to processing B7.

[2] Others

The foregoing technology according to one embodiment may be modified or changed and carried out as follows.

For example, in the nodes 2, the functions of the API providing unit 22 to the device control unit 27 may be integrated in arbitrary combinations, or may each be divided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device for an information processing system, the information processing system including a plurality of information processing devices, the information processing device being one of the plurality of information processing devices and comprising:
   an interface configured to be coupled to a storage device, the storage device being configured to store data to be accessed from the plurality of information processing devices, each of the plurality of information processing devices including an interface configured to be coupled to the storage device in order to share the data with any of the plurality of information processing devices;
   a memory; and
   a processor coupled to the memory and configured to execute a master node process when the processor detects that the information processing device is set as a master node, the master node process comprising:
      classifying the plurality of information processing devices into a plurality of device groups each including a given number of information processing devices, each of the plurality of device groups being configured to provide a service,
      selecting information processing devices one by one from each of the plurality of device groups based on a given selection condition,
      assigning the selected information processing devices to a first update group for each of the plurality of device groups,
      assigning a rest of the plurality of information processing devices except for the selected information processing devices to a second update group for each of the plurality of device groups, the second update group being configured to operate as a failover destination of the first update group in each of the plurality of device groups by using the data in the storage device, and
      transmitting, to first information processing devices in each of of the plurality of device groups, an instruction to update software applied to the first information processing devices, each of the first information processing devices is any of the plurality of information processing devices and belongs to the first update group.

2. The information processing device according to claim 1, wherein the processor
   assigns second information processing devices to a second update group, the second information processing devices each of which is any of the plurality of information processing devices and is not selected in each of the plurality of device groups, and
   makes one of the first information processing devices perform processing of updating the software applied to each of the second information processing devices after completion of the update of the software applied to each the first information processing devices.

3. The information processing device according to claim 1, wherein the given selection condition includes selecting an information processing device from each of the plurality of device groups such that, of n (n is an integer of four or more) information processing devices assigned a role of performing control related to the information processing system, two or more and n−2 or fewer information processing devices are included in the first update group.

4. The information processing device according to claim 1, wherein the given selection condition includes selecting an information processing device from each of the plurality of device groups such that, of n (n is an integer of one or more and three or less) information processing devices assigned a role of performing control related to the information processing system, one or more and n−1 or fewer information processing devices are included in the first update group.

5. The information processing device according to claim 4, wherein the processor assigns the role of performing control related to the information processing system to n−1 information processing devices selected based on the given selection condition among the plurality of information processing devices.

6. An information processing system comprising:
   a plurality of information processing devices;
   each of the plurality of information processing devices comprises:
      an interface configured to be coupled to a storage device, the storage device being configured to store data to be accessed from the plurality of information processing devices;
      a memory; and
      a processor coupled to the memory and configured to execute a master node process when the processor detects that the information processing device is set as a master node, the master node process comprising:
         classifying the plurality of information processing devices into a plurality of device groups each including a given number of information processing devices, each of the plurality of device groups being configured to provide a service,
         selecting information processing devices one by one from each of the plurality of device groups based on a given selection condition,
         assigning the selected information processing devices to a first update group for each of the plurality of device groups,
         assigning a rest of the plurality of information processing devices except for the selected information processing devices to a second update group for each of the plurality of device groups, the second update group being configured to operate as a failover destination of the first update group in each of the plurality of device groups by using the data in the storage device, and
         transmitting, to first information processing devices in each of the plurality of device groups, an instruction to update software applied to the first information processing devices, each of the first information processing devices is any of the plurality of information processing devices and belongs to the first update group.

7. A control method executed by a processor of an information processing device for an information processing system, the information processing system including a plurality of information processing devices, the information processing device being one of the plurality of information processing devices and being set as a master node, each of the plurality of information processing devices including an interface configured to be coupled to a storage device, the storage device being configured to store data to be accessed from the plurality of information processing devices, the control method comprising:

classifying the plurality of information processing devices into a plurality of device groups each including a given number of information processing devices, each of the plurality of device groups being configured to provide a service, selecting information processing devices one by one from each of the plurality of device groups based on a given selection condition, assign assigning the selected information processing devices to a first update group for each of the plurality of device groups, assigning a rest of the plurality of information processing devices except for the selected information processing devices to a second update group for each of the plurality of device groups, the second update group being configured to operate as a failover destination of the first update group in each of the plurality of device groups by using the data in the storage device, and transmit transmitting, to first information processing devices in each of the plurality of device groups, an instruction to update software applied to the first information processing devices, each of the first information processing device is any of the plurality of information processing devices and belongs to the first update group.

* * * * *